Sept. 8, 1953  G. VAN DER MARK ET AL  2,651,416
CENTRIFUGE

Filed June 6, 1950  2 Sheets-Sheet 1

INVENTORS
Gerritt van der Mark
Kornelis van der Mark
By Robert E. Burns
ATTORNEY Sept. 8, 1953 G. VAN DER MARK ET AL 2,651,416
CENTRIFUGE
Filed June 6, 1950 2 Sheets-Sheet 2

Patented Sept. 8, 1953

2,651,416

UNITED STATES PATENT OFFICE 2,651,416

CENTRIFUGE

Gerrit van der Mark and Kornelis van der Mark, Veendam, Netherlands, assignors to Kornelis van der Mark and Duintjer Wilkens Meihuizen & Co., Veendam, Netherlands, a company of the Netherlands Application June 6, 1950, Serial No. 166,324
In the Netherlands June 8, 1949

5 Claims. (Cl. 210—75)

The invention relates to a device for separating solid substances from a fluid by sieving, especially for sieving the potato-fibres from a potato-flour suspension containing potato-fibres.

It is an object of our present invention to provide for a sieving device of small dimensions having a large capacity and being able to discharge the residues, e. g. the potato-fibres, in a highly dehydrated condition.

Another object of our present invention is to provide for a simple sieving device adapted to separate the solid substances from fluids containing solid substances of different sizes.

The novel features, which we consider as characteristic for our invention are set forth in particular in the appended claims.

The invention itself, however, together with additional objects and advantages thereof, will be best understood from the following description of specific embodiments, when read in connection with the accompanying drawings, in which:

Fig. 1 schematically shows a vertical central sectional view of a separator according to the invention along the line I—I in Figure 2.

Figure 1:
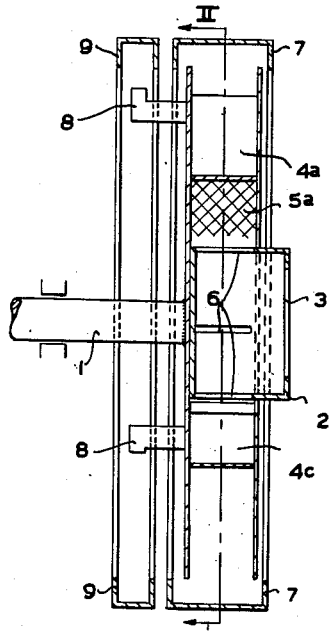
Figure 2A:
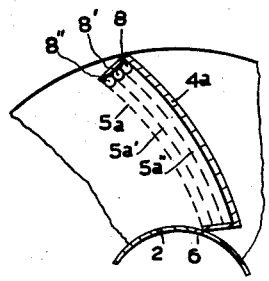
Fig. 2a shows a modified construction of a bucket.
Figure 2:
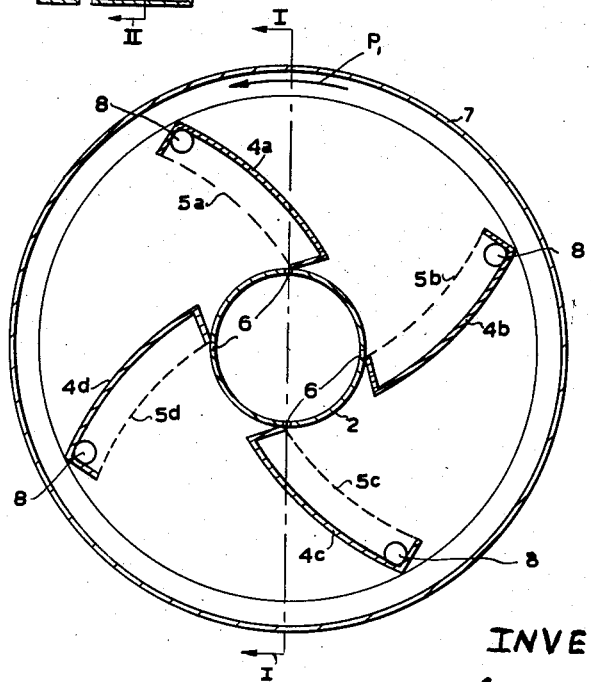
Fig. 2 shows a sectional view along the line II—II in Figure 1.

According to the Figures 1 and 2 a hollow hub 2 is mounted on a rotating shaft 1, said hub being provided with an inlet 3 for the material to be separated. If desired the material could be supplied through a hollow shaft at both sides of the hub.

The hub 2 carries a plurality of buckets 4a–4d, the Figure 2 showing only four of these buckets for the sake of simplicity.

The walls 5a–5d of the buckets which are foremost in the direction of rotation of the bucket-wheel indicated by the arrow $P_1$ in Figure 2, are formed as sieves. In front of each sieve 5a–5d the hub 2 is provided with an axial opening or slot 6 through which the material to be separated is led along the sieve. The material to be separated is axially supplied into the hollow hub 2 and is pressed through the slots 6 and along the sieves by means of the centrifugal force. The water and the fine parts, e. g. the potato flour pass through the sieves and the larger parts, e. g. the potato-fibres, are accumulated on the sieves and are centrifuged along the sieves to the circumference, where they are removed from the device.

For this last purpose, in the embodiment shown a casing 7 is arranged around the bucket-wheel, which casing is provided with an outlet for the fibres (not shown) and which may be constructed as a volute casing.

The water with potato-flour passing through the sieves 5 enters into the buckets 4a–4d and is radially pressed by centrifugal force to the lateral outlets 8, debouching into a second casing 9 at one side of the casing 7, from which second casing 9 the potato-flour suspension is discharged to the factory for further treatment.

For a satisfactory operation of the device according to the invention the form of the sieves is most important. Preferably the sieves 5 are curved, the concave surfaces lying foremost in the direction of rotation.

By varying the curvature the desired relation can be obtained between the centrifugal force transporting the fibres over the sieves to the circumference of the wheel and the resistance against this movement by the curved surface of the sieves, so that the time of sieving the fibres can be varied. On the outer parts of the sieves the mass of fibres is not any more in contact with the supply-water current, so that on these parts the mass of fibres can be further dried. If desired a dry gaseous medium can be led in axial direction through these parts of the sieves for stimulating the drying action.

According to the embodiment shown in Figure 2a each bucket may be provided with a plurality of sieves 5a, 5a' and 5a'' of different mesh placed one behind the other in the direction of rotation, so that before the first sieve 5a, between the following sieves and behind the last sieve 5a'', fluids containing solid substances of different sizes can be treated. Herewith the sieves in each bucket may have a different concavity and/or may be placed under different angles with regard to the closed bottom of the bucket.

Figure 3:
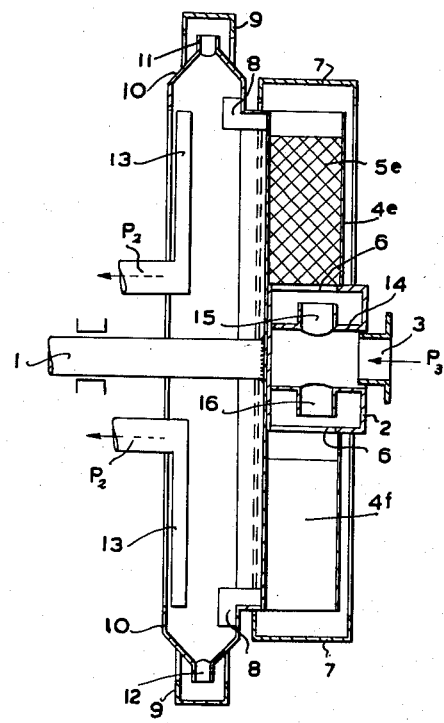
Fig. 3 shows a vertical central view of a modified construction.

Figure 3 shows a section of a modified embodiment taken in such a manner, that two diametrically opposed buckets 4e and 4f are shown from the front and from the back respectively.

A first difference with the embodiment according to the Figures 1 and 2 consists in that the lateral outlets 8 of the buckets debouch into a separate housing or gutter 10 within the casing 9, which gutter is provided with outlets as indicated with 11 and 12. The gutter 10 is fixed to the bucket-wheel and rotates therewith. The fluid in the rotating gutter 10 containing the potato-flour is centrifuged in this gutter and the water with concentrated flour is discharged from the outlets 11, 12 into the casing 9, the water practically free from flour being discharged through suction-conduits 13, 14 in the direction of the arrows P₂.

Figure 3 further shows a rotor-pump 14 within the rotating hollow hub 2 and integral with this hub, for the suction of the material to be separated in the direction of the arrow P₃ and for radially pressing said material through the conduits 15 and 16 to the slots 6 in the hub 2. In this manner a separate supply-pump becomes superfluous.

Figure 5:
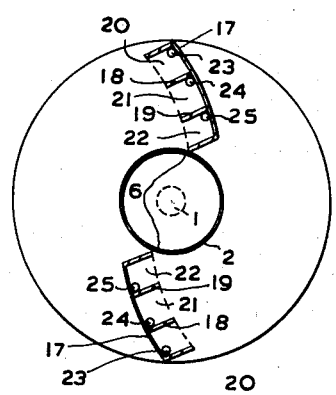
Fig. 5 shows a sectional view along the line V—V in Figure 4.
Figure 4:
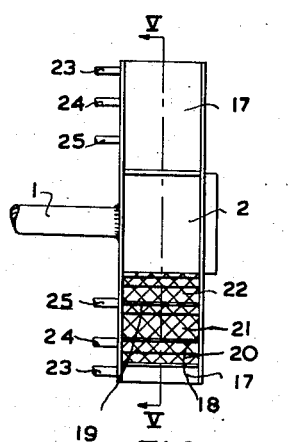
Fig. 4 shows a vertical central sectional view of the bucket wheel with a second modified form of the bucket construction.

Figures 4 and 5 schematically show two diametrically opposed buckets 17 of a modified construction on the shaft 1, each bucket being now divided into compartments 20, 21 and 22 by means of cross-walls 18, 19 and each compartment being provided with a lateral outlet 23, 24 and 25 respectively. In this manner energy can be saved, as the water in the compartments nearer the shaft 1 will have a smaller speed of rotation than the water in the more eccentrically placed compartments. This advantage is important, because most of the water is separated from the mass of fibres on the parts of the sieves near the shaft.

It will be obvious that within the scope of the invention many variations can be applied. Thus for instance it will be possible to wash the fibres before they have left the sieves with fresh water separately supplied at some distance from the shaft. In this case the mass of fibres will be transported into the casing 7 in a rather wet condition, so that this measure is only important when it is desired to remove a large quantity of flour from the mass in the first step and when there is no objection against a discharge of wet fibres. Of course, further separation of flour from the fibres can be obtained in following steps using devices of the same type, e. g. by placing a plurality of bucket-wheels on the same shaft and by providing the necessary connecting conduits.

It will also be possible to provide the casing 7 with a grater cooperating with the buckets for disintegrating the fibres leaving the sieves, after which these fine fibres may be transported to a following device provided with a bucket-wheel having sieves of smaller mesh. In this manner very coarse material can be treated in the first device, so that a preliminary treatment of the material, such as potatoes, can be simplified.

The device according to the invention is of a simple construction, but has a large capacity in view of the small dimensions and the small driving force needed, as the material is continuously sieved out during the displacement in a radial direction and as the residues are automatically further dried and discharged, without the application of any special discharging means, such as transporting screws or the like.

In practice it has been proved, that a device according to the invention with a diameter of the bucket-wheel (from outside to outside of the buckets) of 28 inch, provided with 8 buckets with sieves having a total sieving surface of ±465 square inches and with a rotation speed of 1500–3000 rev./min., has an output of potato-flour equal to the output of a usual machine with shaking sieves with a sieving surface of about 46,500 square inches, so that the device according to the invention needs only 1% of the sieving surface of the devices known in this art.

With the device according to the invention the separated potato-fibres can be directly stored or transported from the factory without further drying, whereby an important saving can be obtained.

We claim:

1. A device for separating solid substances from a fluid by sieving comprising a rotatable bucket-wheel having a hollow cylindrical hub and a plurality of buckets disposed circumferentially around said hub, each of said buckets having side and end walls defining a chamber and having a liquid-admitting forward wall in the form of a sieve disposed in the direction of rotation of said bucket-wheel, said hollow hub being provided with inlet means for entry into the hub of the material to be sieved and being provided with radial outlet means opposite each sieve for radially supplying the material from said hub to said sieves, said outlet means extending the width of the corresponding sieve and associated bucket, each of said buckets being provided with an axially extendng outlet conduit for discharging the material which has passed through the sieve into the bucket, and a casing positioned around said bucket-wheel for receiving the material carried by centrifugal force across the surface of said sieves.

2. A device for separating solid substances from a fluid by sieving comprising a rotatable bucket-wheel having a hollow cylindrical hub and a plurality of buckets disposed circumferentially around said hub, each of said buckets having side and end walls defining a chamber and having a liquid-admitting forward wall in the form of a sieve disposed in the direction of rotation of said bucket-wheel, said sieve on each bucket being inclined forwardly of a radial line extending from said hub, said hollow hub being provided with inlet means for entry into the hub of the material to be sieved and being provided with radial outlet means opposite each sieve for radially supplying the material from said hub to said sieves, said outlet means extending the width of the corresponding sieve and associated bucket, each of said buckets being provided with an axially extending outlet conduit for discharging the material which has passed through the sieve into the bucket, a casing positioned around said bucket-wheel for receiving the material carried by centrifugal force across the surface of said sieves, a second casing positioned at one side of and parallel to said first-named casing, and said outlet conduits extending into said second casing for discharging the material from said sieves therein.

3. A device for separating solid substances from a fluid by sieving comprising a rotatable bucket-wheel having a hollow cylindrical hub rotatable on a horizontal axis and a plurality of buckets disposed circumferentially around said hub, each of said buckets having side and end walls defining a chamber and having a liquid-admitting forward wall in the form of a sieve disposed in the direction of rotation of said bucket-wheel, said sieve on each bucket being inclined forwardly of a radial line extending from said hub, said hollow hub being provided with inlet means for entry into the hub of the material to be sieved and being provided with radial outlet means opposite each sieve for radially supplying the material from said hub to said sieves, said outlet means extending the width of the corresponding sieve and associated bucket, each of said buckets being provided with an axially extending outlet conduit for discharging the material which has passed through the sieve into the bucket, a casing positioned around said bucket-wheel for receiving the material carried by centrifugal force across the surface of said sieves, a second casing positioned at one side of and parallel to said first-named casing, said outlet conduits extending into said second casing for discharging the material from said sieves therein, a gutter disposed within said second casing, said gutter being rotatable with said bucket-wheel, outlet means in the bottom of said gutter discharging into said second casing, and a plurality of suction conduits having their inlet ends adjacent said gutter.

4. A device for separating solid substances from a fluid by sieving comprising a rotatable bucket-wheel having a hollow cylindrical hub and a plurality of buckets disposed circumferentially around said hub, each of said buckets having side and end walls defining a chamber and having a liquid-admitting forward wall in the form of a sieve disposed in the direction of rotation of said bucket-wheel, said hollow hub being provided with inlet means for entry into the hub of the material to be sieved and being provided with radial outlet means opposite each sieve for radially supplying the material from said hub to said sieves, said outlet means extending the width of the corresponding sieve and associated bucket, each of said buckets being provided with an axially extending outlet conduit for discharging the material which has passed through the sieve into the bucket, and a casing positioned around said bucket-wheel for receiving the material carried by centrifugal force across the surface of said sieves, each of said buckets being provided with at least one other sieve substantially parallel to said first-named sieve and disposed behind said first-named sieve in the direction of rotation of the bucket-wheel.

5. A device for separating solid substances from a fluid by sieving comprising a rotatable bucket-wheel having a hollow cylindrical hub and a plurality of buckets disposed circumferentially around said hub, each of said buckets having side and end walls defining a chamber and having a liquid-admitting forward wall in the form of a sieve disposed in the direction of rotation of said bucket-wheel, said hollow hub being provided with inlet means for entry into the hub of the material to be sieved and being provided with radial outlet means opposite each sieve for radially supplying the material from said hub to said sieves, said outlet means extending the width of the corresponding sieve and associated bucket, each of said buckets being provided with an axially extending outlet conduit for discharging the material which has passed through the sieve into the bucket, a casing positioned around said bucket-wheel for receiving the material carried by centrifugal force across the surface of said sieves, each of said buckets being provided with a plurality of axially-extending cross walls dividing each bucket into a plurality of compartments lying at different distances from the axis of rotation of the bucket-wheel, and each of said compartments being provided with separate outlet means for discharging the fluid which has passed through the sieve at different distances from said axis.

GERRIT van der MARK.
KORNELIS van der MARK.

References Cited in the file of this patent

UNITED STATES PATENTS

| Number | Name | Date |
| --- | --- | --- |
| 462,495 | Long | Nov. 3, 1891 |
| 891,271 | Ljungstrom | June 23, 1908 |
| 1,254,160 | Souza | Jan. 22, 1918 |
| 1,887,129 | Hirsch | Nov. 8, 1932 |
| 2,501,924 | Verdoorn et al. | Mar. 28, 1950 |
| 2,561,186 | Dunham | July 17, 1951 |